United States Patent
Hamadate

[11] Patent Number: 5,969,769
[45] Date of Patent: Oct. 19, 1999

[54] TELEVISION SET HAVING A MULTIPLE-DIVISION SCREEN

[75] Inventor: Shunichi Hamadate, Saitama-ken, Japan

[73] Assignee: Kabushiki Kaisha Toshiba, Kawasaki, Japan

[21] Appl. No.: 08/829,422

[22] Filed: Mar. 31, 1997

Related U.S. Application Data

[63] Continuation of application No. PCT/JP96/02994, Oct. 16, 1996.

[30] Foreign Application Priority Data

Oct. 18, 1995 [JP] Japan .................................. 7-270126

[51] Int. Cl.$^6$ .............................. H04N 5/44; H04N 5/45
[52] U.S. Cl. ........................ 348/568; 348/563; 348/564; 348/565; 348/732
[58] Field of Search .................................. 348/564, 565, 348/566, 567, 568, 569, 570, 563, 732; H04N 44/45

[56] References Cited

U.S. PATENT DOCUMENTS

| | | | |
|---|---|---|---|
| 4,905,077 | 2/1990 | Ishii | 348/564 |
| 5,194,954 | 3/1993 | Dufield | 348/732 |
| 5,420,642 | 5/1995 | Baek | 348/565 |
| 5,432,560 | 7/1995 | Ersoz | 348/565 |
| 5,729,300 | 3/1998 | Ahn | 348/565 |
| 5,734,444 | 3/1998 | Yoshinbu | 348/731 |

FOREIGN PATENT DOCUMENTS

| | | | |
|---|---|---|---|
| 550911 B1 | 7/1993 | European Pat. Off. | H04N 5/44 |
| 62-263781 | 11/1987 | Japan . | |
| 6-54269 | 2/1994 | Japan . | |
| 8-223495 | 8/1996 | Japan . | |

*Primary Examiner*—John K. Peng
*Assistant Examiner*—Wesner Sajous
*Attorney, Agent, or Firm*—Pillsbury Madison & Sutro LLP

[57] ABSTRACT

According to the preset mode instructions from the operating part 111, data of a plurality of channels to be included in the search screen are input from the operating part 111. These channel data are transferred to the second channel selection controlling part 109 for storage. When preparing, a search screen, these stored channel data are used for constituting a search screen, which is displayed on the displaying part 112. The channels desired or frequently watched by the user alone are searched and their images are displayed on the multiple-division screen as still pictures.

1 Claim, 7 Drawing Sheets

FIG.4

| X | | Y | |
|---|---|---|---|
| 1 | 1 | 4 | 6 |
| | 8 | 12 | 14 |
| | 32 | 55 | 99 |

FIG.6

| | | |
|---|---|---|
| 1 | 4 | 6 |
| 8 | 12 | 14 |
| 32 | 55 | 99 |

SERCH SCREENS ARE NOT ONLY DISPLAYED IN THE SUB-SCREEN, BUT ALSO A WHOLE SCREEN IS DIVIDED INTO SEARCH SCREENS.

TELEVISION SET HAVING A MULTIPLE-DIVISION SCREEN

This application is a continuation of PCT/JP96/02994 filed Oct. 16, 1996.

TECHNICAL FIELD

The present invention relates to a television set which can automatically search the currently broadcasted channels for channel selection and display video data from different broadcasting channels on different multiple-division screens of a display unit, that is, a television set with a so-called "search screen display" function.

BACKGROUND OF RELATED ART

In addition to conventional ground broadcasting, satellite broadcasting services using broadcasting satellites (BS) and communication satellites (CS) are currently in use. Television sets with a converter to receive such satellite broadcasting are available on the market, but since that the number of such channels is increasing, there is a need for useful broadcasting channel selection.

For the ground broadcasting, on the other hand, the second generation EDTV broadcasting is under study. The aspect ratio of the TV broadcasted images is changing from the current ratio of 4:3 to the wide aspect ratio of 16:9 while maintaining compatibility with the current broadcasting. Television sets for the second generation EDTV broadcasting are designed to maintain the compatibility with the conventional images. Specifically, when displaying an image with the aspect ratio of 4:3 on a display unit for the aspect ratio of 16:9, the image is compressed in the horizontal direction so that the 4:3 image can be displayed on the 16:9 screen.

Some inventions have disclosed using a blank part on the screen generated by compression when a television set for the wide aspect ratio receives the ground and satellite broadcasting, proposing that such blank parts be used for broadcasting channel selection as described above.

One of such proposals is disclosed in Published Unexamined Japan Patent Application No. 62-263781 (No. 263781/1987). This application discloses a television set which displays images of other channels and high definition TV images in the blank part of the screen. By displaying, images of many broadcasting stations other than the selected one at the same time, this television set provides a useful advantage for channel selection to the user.

A known television set having two tuners which uses one tuner to display images from the selected broadcasting station and the other tuner to repetitively select channels one by one so that images from a plurality of stations can be displayed at the same time as reduced images on the display unit. Thus, the image displayed on the screen can be quickly switched between the images based on both tuners (Refer to Published Unexamined Japan Patent Application No. 6-54269 (No. 54269/1994)).

Another invention proposes a television set having two divisional screens which displays reduced images (search screen) from various stations on one of the screens [Refer to Published Unexamined Japan Patent Application No. 8-223495 (No. 223495/1996) (Japan Patent Application No. 7-30880 (No. 30880/1995))].

With such configuration, the user can check the reduced images from various stations to select a channel and immediately display the selected image on the main screen.

With an increasing numbered channels, however, there is a problem that such television set cannot display all channels to be watched. Therefore, the search screen is designed to allow switching as shown in FIGS. 7(*a*) and (*b*). Specifically, after searching Channels 1 to 9 as shown in FIG. 7(*a*), the search screen is switched to the next screen displaying Channels 10 to 18 for searching as shown in FIG. 7(*b*).

In the above case, a two-screen displaying television set with the main screen on the left and the sub-screen on the right is provided with a function to display nine reduced images on the sub-screen as the search screen for the broadcasting waves which is received as input signals to the antenna. It has a memory for each of these nine images and the video data channel-searched and selected by the tuner is stored on the memory for later displaying on the screen. Naturally, they are still pictures. It has nine small screens only and, if there are ten or more broadcasting stations, it is necessary to switch to the next set of small screens. The data on the memories are updated by searching again upon completion of the nine small screens, searching so that the image is switched to a new one.

Though this configuration can display all channels on the search screen, it cannot display all channel data on a single screen. It is always necessary to follow a troublesome operation procedure to switch between screens.

Therefore, it is an object of the present invention to provide a television set which can display all channels desired or frequently used by the user on one screen to as the search screen.

DISCLOSURE OF THE INVENTION

According to a preferred embodiment of the present invention, a television set which enables simultaneous display of a plurality of broadcasted images on a multiple-division screen comprises:

operating means for providing preset mode instructions and search instructions and inputting channel information;

setting means for presetting a plurality of channels to be displayed on the multiple-division screen by the operating means with the television set held in the preset mode by the operating means;

first storage means for storing information of a plurality of channels set by the setting means;

channel selection means for searching and selecting the plurality of channels stored by the first storage means one by one according to the search instruction from the operating means;

second storage means for compressing the video signals of each of the channels selected in searching by the channel selection means and storing them as the multiple-division video data; and display means for displaying the multiple-division video data read from the second storage means as the search screen.

With this configuration, the user inputs data of a plurality of channels to be included in the search screen through the operating means according to the preset mode instructions from the operating means. The channel data are transferred to the first storage means for storage. When preparing a search screen with multiple-division images according to the search instructions from the operating means, the channels stored in the first storage means are searched one by one for selection so that the search screen including multiple small screens is prepared and displayed on the display means.

Thus, the search screen collects the channels desired or frequently watched by the user as the video data.

According to another preferred embodiment of the present invention, a television set having left and right divisional screens which can display the ordinary image on one screen and multiple-division screen for searching on the other screen comprises:

operating means for providing preset mode instructions and search instructions and inputting channel information;

first channel selection means for selecting and receiving the broadcasting signal of the ordinary image by channel input through the operating means;

first compressing means for compressing the ordinary video signal of the channel selected by the first channel selection means in the horizontal direction;

setting means for presetting a plurality of channels to be displayed on the multiple-division screen by the operating means with the television set held in preset mode by the operating means;

first storage means for storing information of a plurality of channels set by the setting means;

second channel selection means for searching and selecting the plurality of channels stored by the first storage means one by one according to the search instruction from the operating means;

second storage means for compressing the video signals of each of the channels selected in searching by the second channel selection means and storing them as the multiple-division video data;

synthesizing means for synthesizing the compressed ordinary video data from the first compressing means and the multiple-division video data as the search screen read from the second storage means so that they are displayed on the left and right screens of the display screen; and display means for displaying the synthesized video data from the synthesizing means as the two-screen signal.

With this configuration, one of the two screens (sub-screen, for example) can be used as the search screen for searching the channels desired by the user. When selecting a channel, the user can check such search screen and select one to immediately display the image of the selected channel on the other screen (main screen, for example).

BRIEF DESCRIPTION OF THE DRAWINGS

FIG. 4 is a diagram to show the divisional screens displayed on the displaying part in FIG. 1;

FIG. 6 is a diagram to show the screen displaying the search screen only on the displaying part in FIG. 1.

DETAILED DESCRIPTION OF THE PREFERRED EMBODIMENT

Referring to the attached figures, preferred embodiments of the present invention are described below.

Figure 1:
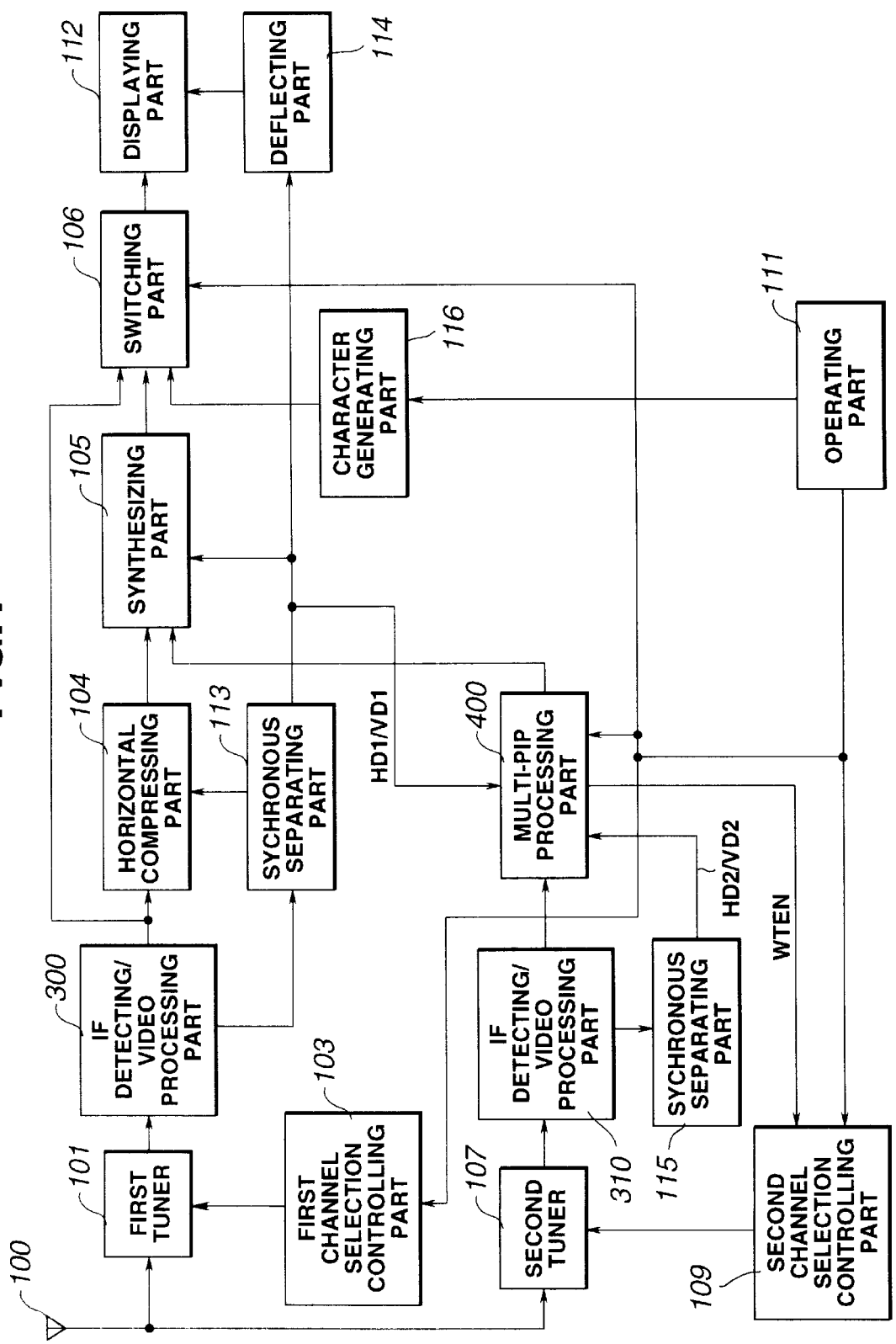
FIG. 1 is a block diagram to show the configuration of one embodiment of a television set according to the present invention.
Figure 2:
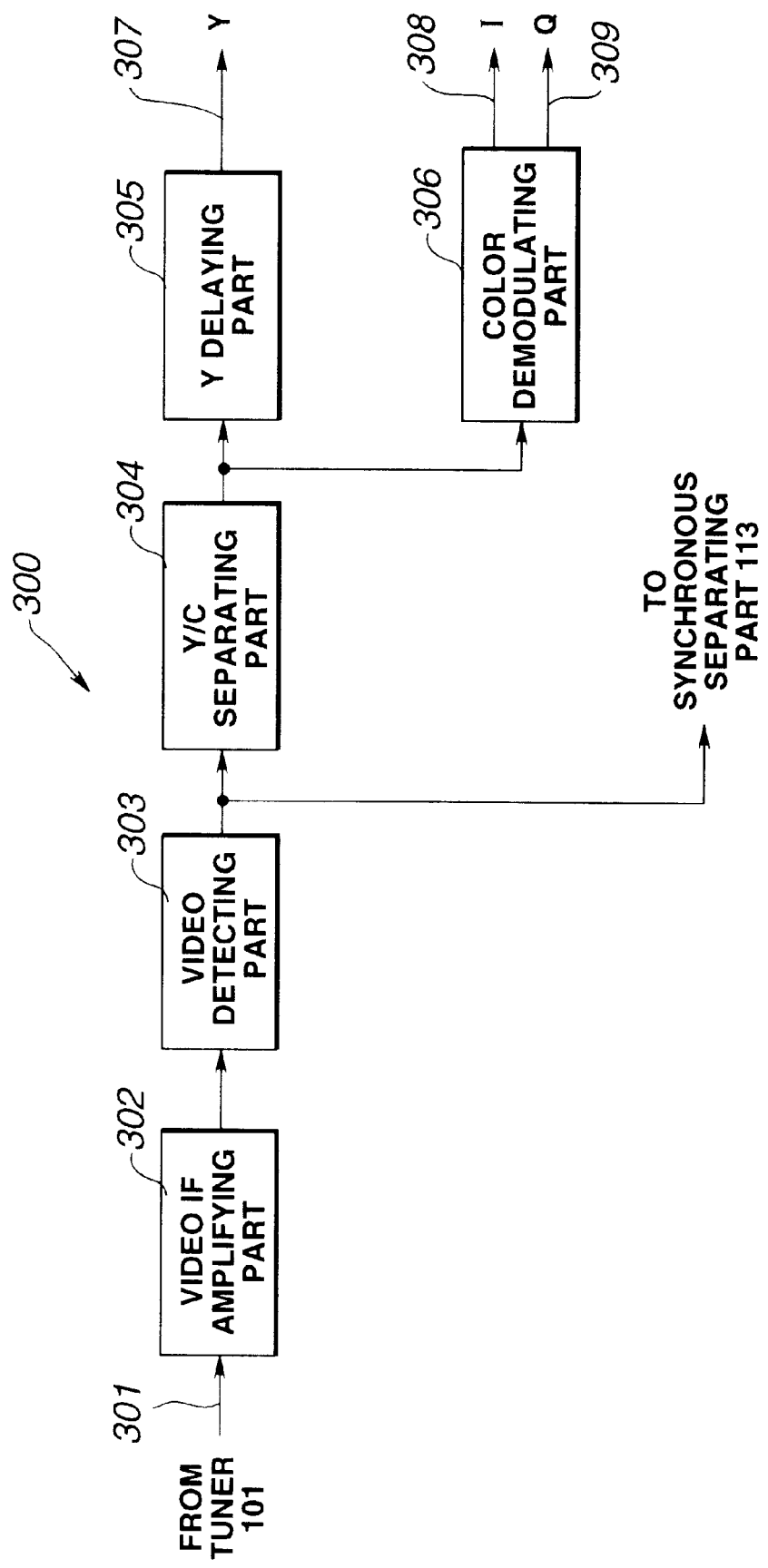
FIG. 2 is a block diagram to show the configuration of an IF detecting/video processing part in FIG. 1.
Figure 3:
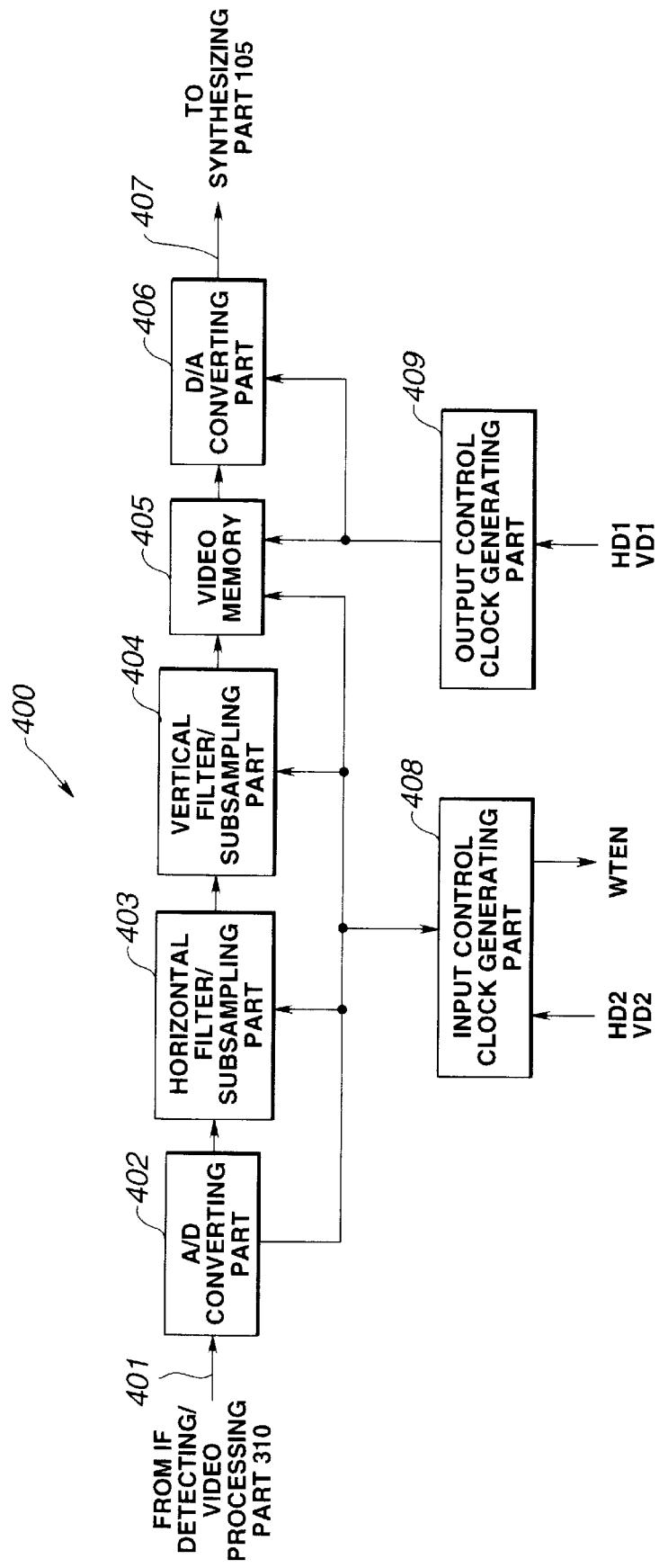
FIG. 3 is a block diagram to show the configuration of a multi-PIP processing part in FIG. 1.
Figure 4:
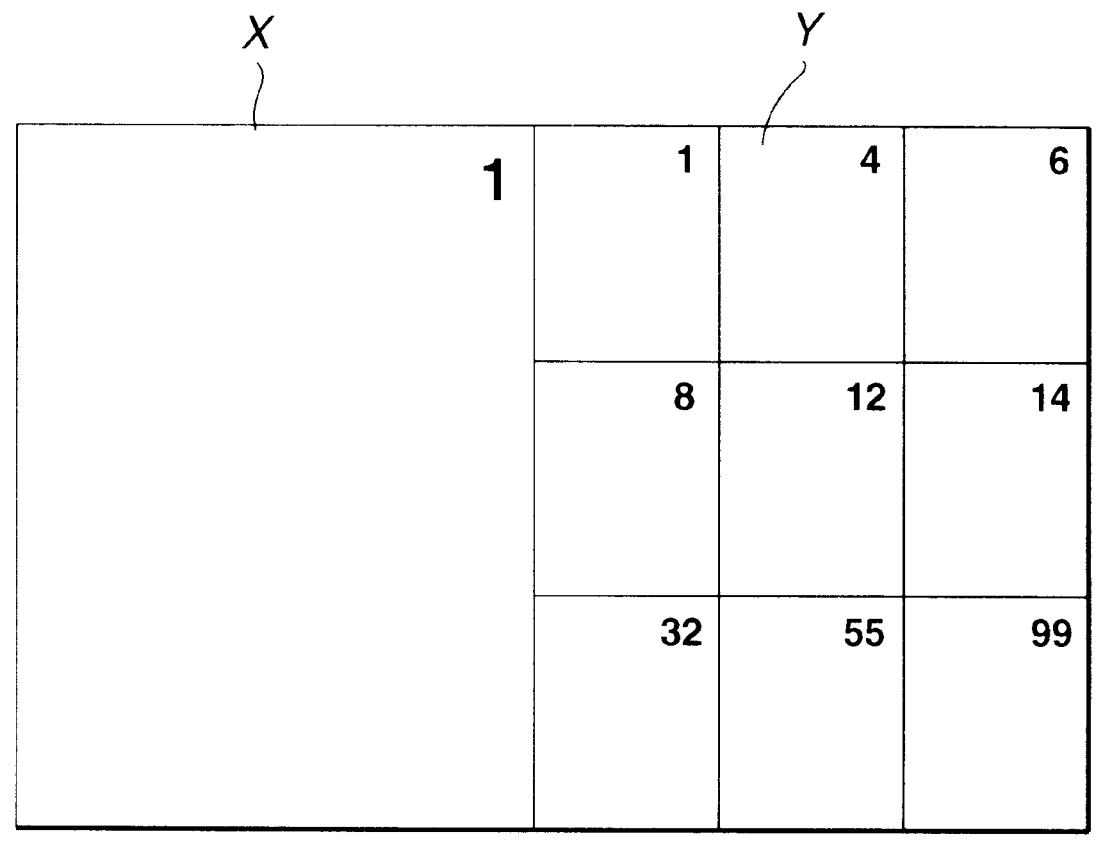

FIG. 1 is a block diagram showing an embodiment of a television set according to the present invention. FIG. 2 is a block diagram showing the configuration of IF detecting/video processing part in FIG. 1. FIG. 3 is a block diagram showing the configuration of a multi-PIP processing part in FIG. 1. FIG. 4 shows the display status when the selected image and reduced images on the search screen are displayed on the two divisional screens.

Referring to FIG. 1, the broadcasting wave is received by an antenna 100 and, with a first tuner 101 as a first channel selection means, tuned with the selected channel according to the channel selection by an operating part 111. The channel number selected by the operating part 111 is supplied to a first channel selection controlling part 103, from which the tuning voltage corresponding to the selected channel is supplied to the tuner 101 so that the selected channel wave can be tuned. The first channel selection controlling part 103 is provided with a memory to store the channel selection data required for selecting regular broadcasting channels.

The first tuner 101 converts the broadcasting wave from the selected broadcasting station to an intermediate frequency (hereinafter, so-called IF), which is supplied to an IF detecting/video processing part 300. Further, the IF detecting/video processing part 300 supplies the processed video signal to a switching part 106. The signal from the IF detecting/video processing part 300 is also supplied to a horizontal compressing part 104 serving as a first compressing means, where the signal is compressed to a half of the time axis in the horizontal direction. The signal compressed at the horizontal compressing part 104 is supplied to a synthesizing part 105. The horizontal compressing part 104 comprises an A/D converter, a video memory, a D/A converter, a writing clock generating part and a reading clock generating part. From the horizontal compressing part 104, the video signal reduced by half is output for the horizontal display period corresponding to the left half of the whole display screen.

The IF detecting/video processing part 300 comprises, as shown in FIG. 2, a video IF amplifying part 302, a video detecting part 303, a Y/C separating part 304, a Y delaying part 305 and a color demodulating part 306 and processes a signal 301 from the tuner 101. It firstly amplifies the signal from the tuner 101 at the amplifying part 302 to obtain sufficient amplitude and detects the signal at the detecting part 303 at the next step. The Y/C separating part 304 separates a brightness signal 307 and color signals 308 and 309 from the detected signal. The brightness signal Y is delayed at the Y delaying part 305 so as to be synchronized with time lag of the color signals 308 and 309. The color signals are processed for correct demodulation of the color signals at the color demodulating part 306: the orthogonal components (I signal 308 and Q signal 309) are taken out and supplied to the horizontal compressing part 104 at the next step and the switching part 106. Furthermore, the video detecting part 303 supplies the detected signal from its output end to a synchronous separating part 113.

For easy understanding, the brightness signal and color signals are shown as the video signal in the block diagram of FIG. 1 to show their route only.

Furthermore, the signal from the synchronous separating part 113 is supplied to the deflecting part 114, and from the deflecting part 114, the deflection signal is supplied to a displaying part 112 as a displaying means. The displaying part 112 comprises a cathode ray tube (CRT), for example, and makes deflective scanning according to the above deflected signal to display the video image.

On the other hand, the signal converted to the IF at a second tuner 107 as a second channel selection means is, via another IF detecting/video processing part 310, supplied to a multi-PIP (Picture in Picture) processing part 400. The second tuner 107 selects a channel according to the tuning voltage from a second channel selection controlling part 109. The second channel selection controlling part 109 is provided with a memory, which stores the data required for selecting regular broadcasting channels and at the same time stores, in the first storage means, the channel selection data corresponding to the channels set in the search setting under the preset mode.

Signals sent to the multi-PIP processing part 400 include, in addition to the horizontal/vertical synchronization signals (HD2, VD2) from a synchronous separating part 115, the synchronization signals from the synchronous separation part 113 (HD1, VD1). It is designed to operate in synchronization with the IF detecting/video processing part 300 connected to the first channel selection means. This multi-PIP processing part 400 compresses the video signals from various broadcasting stations in the horizontal and vertical directions. In other words, the multi-PIP processing part 400 serves as a second compressing means.

As shown in FIG. 3, the multi-PIP processing part 400 converts a signal 401 from the IF detecting/video processing part 310 into a digital signal at an A/D converting part 402 and, after digital signal processing, outputs the signal from a D/A converting part 406 as an analog signal 407. A digital signal processing part comprises a horizontal filter/sub-sampling part 403 which makes horizontal sub-sampling and limits the band, a vertical filter/sub-sampling part 404 which makes vertical sub-sampling and limits the band, a video memory 405 as a second storage means, and an input control clock generating part 408 and an output control clock generating part 409 to control writing/reading of the video memory 405. The horizontal filter/sub-sampling part 403 and the vertical filter/sub-sampling part 404 reduce the sampling rate and compress the data amount of the video data. The compressed video signal is further written to the video memory 405 as the second storage means and stored.

Data stored by video memory 405 is provided for each channel. Upon completion of storage by video memory 405 for a channel, the multi-PIP processing part 400 supplies a signal (WTEN) to inform the end of writing to the second channel selection controlling part 109. When this end signal (WTEN) is supplied, the second channel selection controlling part 109 supplies the tuning voltage for the next station to the second tuner 107. The second tuner 107 supplies the video signal of the next station to the IF detecting/video processing part 310 and the multi-PIP processing part 400 compresses the signal in the horizontal and vertical directions and similarly to the procedure above, stores the video data of the next station at the video memory 405. This procedure is repeated so that the video signals from various broadcasting stations are stored in the video memory 405. The multi-PIP processing part 400 is provided with a counter circuit to assure that the video data is written to the video memory 405 after channel selection by measuring the time up to the completion of channel selection at the second tuner 107. The stored video signals are read with the clock frequencies synchronized with the horizontal and vertical synchronization signals (HD1/VD1) and supplied to the synthesizing part 105. From the multi-PIP processing part 400, compressed video signals arranged for nine small screens (for nine channels), for example, are output for the horizontal display period corresponding to the right half of the display screen.

The synthesizing part 105 comprises, for example, a switching part and a switch controlling part to control the switch. It alternately selects the video signal from the horizontal compressing part 104 and the video signals from the multi-PIP processing part 400 during a horizontal display period to synthesize them into a two-screen signal, which is output to the switching part 106. The multi-PIP processing part 400 and the horizontal compressing part 104 may be designed not to perform D/A conversion, in which case digital signals are synthesized before D/A conversion and then converted into an analog signal and output to the switching part 106.

The switching part 106 switches among the synthesized two-screen signal from the synthesizing part 105, the ordinary video signal from the IF detecting/video processing part 300 and a character information signal from a character generating part 116 and supplies the switched signal to the displaying part 112.

As shown in FIG. 4, the displaying part 112 displays the video data X which has been compressed to a half in the horizontal direction on the left side of the whole screen, for example, and the multiple-screen image Y containing reduced images from various stations on the right side of the screen.

Referring to FIG. 4, the operation of FIG. 1 is described here.

The user transfers from the operating part 111 the channel information for multiple screen display specifying the desired channels (frequently selected channels, for example) as the preset data to the second channel selection controlling part 109. The preset data is set and stored in the storage part (not shown) in the second channel selection controlling part 109. In the channel selection with searching, channels are searched based on this preset information for searching. The channel selection with searching is made in the ascending order of the channel numbers, with skipping the channels omitted in the preset data. The reduced images on the right side of the screen are of the channels preset by the user as shown in FIG. 4 (See the set channels in FIG. 5), i.e. the images of the channels desired by the user as those frequently watched are displayed.

Note that the data of the skipped channels not included in the preset channels above (i.e. the channels not particularly desired) can be cut away, but they are kept to be displayed in the following search screen after switching according to this embodiment. In this case, switching to the following search screen can be achieved by preparing a plurality of memories which can be switched among them.

It is also easy to design the configuration so that the preset search screen can be changed to the ordinary search screen (to continuously search the channels in the ascending order of the channel numbers). Specifically, it can be designed to allow the user to switch between the searching according to the preset specification of desired channels and the conventional automatic searching (in the ascending order of the channel numbers) by ignoring the preset specification above.

Further, it is also possible to allow a plurality of preset specifications. By providing a plurality of preset modes such as Preset 1 and Preset 2, a plurality of users can enjoy nine-divided screen searching according to their individual preferences.

Figure 5A:
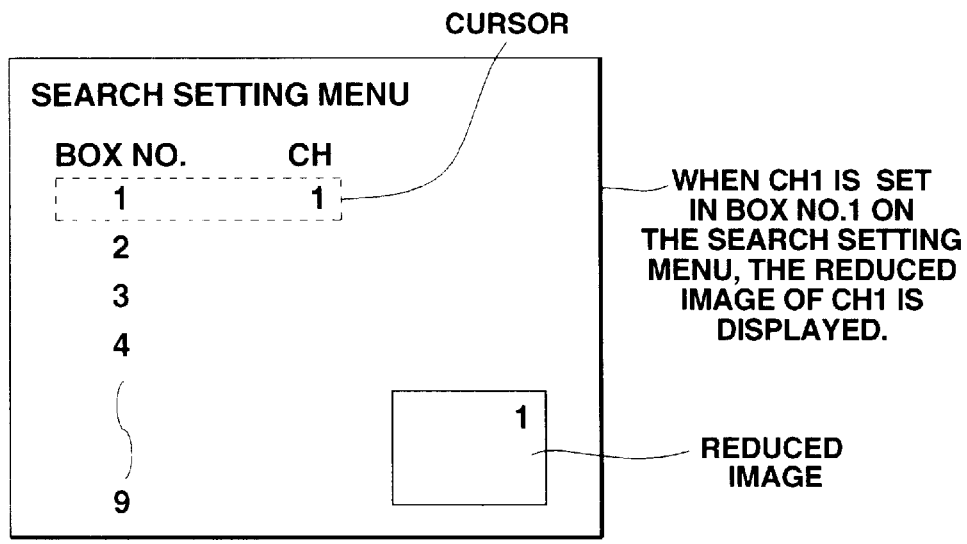
FIGS. 5(a) and 5(b) are diagrams to show the channel setting on the menu screen displayed on the displaying part in FIG. 1.
Figure 5B:
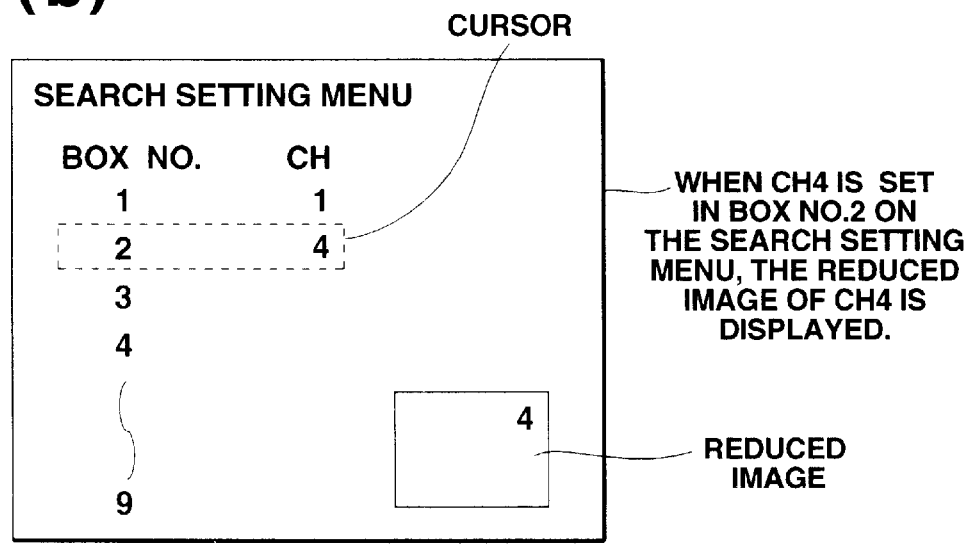
Figures 7A, 7B:
FIGS. 7(a) and 7(b) are diagrams to show a conventional example of search screen display.

Next, referring to the menu screen for search setting as shown in FIGS. 5(a) and 5(b), the search screen setting is described below.

When the menu screen is used as a setting means, the user's operation of a search setting key on the operating part 111 causes the character data from the character generating part 116 such as a character generator to be displayed on the displaying part 112 via the switching part 106. In this displaying part 112, the data input from the operating part 111 can be added to the data from the character generating part 116. Each of the small screens in the multiple-screen display Y is provided with a box number (Box Nos. 1 to 9). For each of these box numbers 1 to 9, the user can input the desired channels to be searched (CH) from the operating part 111. On the menu screen, the insertion position of the character information is, for example, indicated by flickering of the cursor or change of the cursor color. The channel information for setting the searched channels from the operating part 111 is, as the input data, transferred to the second channel selection controlling part 109 and at the same time to the character generating part 116. In setting of the searched channels on the menu screen, when the user specifies Channel 1 (CH1) for Box No. 1 with the operating part 111 as shown in FIG. 5(a), for example, the reduced image of the specified channel (CH1) is obtained from the multi-PIP processing part 400 as the second compression means so that this image is displayed on a sub-screen via the synthesizing part 105 and the switching part 106. Similarly, when the user specifies Channel 4 (CH4) for Box No. 2 as shown in FIG. 5(b), the reduced image of CH4 is displayed on the sub-screen. The second channel selection controlling part 109 stores the channel information set here to the storage part (not shown) and, for searching, the preset channels alone are selectively searched. In this procedure, display of the reduced image on the menu screen constituted by the character information signal from the character generating part 116 is achieved by the switching part 106, which outputs the compressed video signal from the multi-PIP processing part 400 instead of the menu screen signal for the period for the reduced image so that the desired reduced image is superimposed on the menu screen.

FIG. 6 shows a variation of this embodiment which enables to use the whole screen of the displaying part 112 for searching. In this case, the synthesizing part 105 is switched to receive the signal from the multi-PIP processing part 400 and the reading clock frequency for the video memory 405 in the multi-PIP processing part 400 is reduced to a half of that for two-screen display mode so that the search screen is enlarged in the horizontal time axis direction, which results in the display using the whole screen.

As described above, a television set according to the present invention has an advantage of enabling the display of the desired channels to be searched at a time using the search screen.

According to the present invention, one of the divisional screens in two-screen display mode can be used as the search screen to show a plurality of desired channels. Thus, when the user wants to select a channel, he/she can check the images of the channels on the search screen on one of the divisional screens and quickly select the desired channel.

The present invention further enables insertion of a reduced image of the specified channel into a part of the menu screen during channel setting using the menu screen. With this function, the user can check the images of the channels he/she intends to preset during presetting process.

What is claimed is:

1. A television set having left and right divisional screens which can display an ordinary image on the one screen and a multiple-division screen for searching on the other screen comprising:

operating means for providing preset mode instructions and search instructions and inputting channel information;

first channel selection means for selecting and receiving the broadcasting signal of the ordinary image by said input channel information from said operating means;

first compressing means for compressing the signal of the ordinary image selected by said first channel selection means in the horizontal direction;

setting means which can be preset so as to select desired channels among a plurality of channels by the operation of said operating means when a preset mode is set by said operating means and display video data of each selected desired channel at a respective desired display position among a plurality of display positions in the multiple-division screen;

first storage means for storing information of a plurality of channels set by said setting means;

second channel selection means for searching and selecting among the plurality of channels stored by said first storage means one by one according to the search instructions from said operating means;

second storage means for compressing the video signals of the channels selected by said second channel selection means and storing them as the multiple-division video data;

synthesizing means for synthesizing the compressed data of the ordinary image from said first compressing means and the multiple-division video data as the search screen read from said from second storage means so that they are presented on the left and right sides of the display screen; and display means for displaying the synthesized video data from said synthesizing means as the two-screen signal;

wherein said setting means comprises:

character generating means for generating a menu screen to input the information of the channels to be set for each sub-screen of the multiple-division screen;

second compressing means, when setting channels corresponding to each sub-screen of the multiple-division screen from said menu screen by using said operating means, for compressing the video signals obtained for such set channels by channel selection executed by said second channel selection means and outputting them as the reduced video data; and synthesizing means for superimposing the reduced video data from said second compressing means on the menu screen from said character generating means and for obtaining the checking image corresponding to the set channel.

* * * * *